(12) United States Patent
Bhargava et al.

(10) Patent No.: US 8,212,996 B2
(45) Date of Patent: Jul. 3, 2012

(54) METHOD FOR CENTROIDING AND TRACKING A DISTORTED OPTICAL IMAGE

(75) Inventors: Anuradha Bhargava, Reading, MA (US); Harold T. Wright, Pelham, NH (US); Kazimierz T. Grzeslak, Bedford, NH (US); Arnold Kravitz, Moorestown, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 13/277,640

(22) Filed: Oct. 20, 2011

(65) Prior Publication Data
US 2012/0033084 A1 Feb. 9, 2012

Related U.S. Application Data

(62) Division of application No. 12/228,511, filed on Aug. 11, 2008, now Pat. No. 8,068,214.

(60) Provisional application No. 61/010,495, filed on Jan. 7, 2008.

(51) Int. Cl.
*G01C 3/08* (2006.01)

(52) U.S. Cl. ........ 356/4.01; 356/3.01; 356/3.1; 356/4.1; 356/5.01; 356/5.1

(58) Field of Classification Search ......... 356/3.01–28.5
See application file for complete search history.

(56) References Cited

U.S. PATENT DOCUMENTS

| | | | |
|---|---|---|---|
| 5,657,251 A | 8/1997 | Fiala | |
| 5,818,527 A | 10/1998 | Yamaguchi | |
| 6,057,915 A | 5/2000 | Squire et al. | |
| 6,519,371 B1 | 2/2003 | Pain | |
| 7,098,949 B2 | 8/2006 | Stavely | |
| 7,181,082 B2 | 2/2007 | Feng | |
| 7,187,413 B2 | 3/2007 | Alderson | |
| 2005/0259888 A1 | 11/2005 | Ozluturk | |
| 2006/0192090 A1 | 8/2006 | Lau | |
| 2006/0235614 A1* | 10/2006 | Jacox et al. | 701/222 |
| 2006/0257004 A1 | 11/2006 | Chen | |

OTHER PUBLICATIONS

The SDSS Data System and Data Products, http://www.astro.princeton.edu/PBOOK/datasys/datasys.htm, Feb. 12, 2000 44 pages.

* cited by examiner

*Primary Examiner* — Luke Ratcliffe
(74) *Attorney, Agent, or Firm* — Daniel J. Long; Robert K. Tendler

(57) ABSTRACT

A centroiding method is provided for an optical tracking system including a laser used for countermeasuring purposes in which a pencil thin laser beam is accurately positioned onto a target through the use of centroiding techniques for ascertaining the position not only of the target but also the laser beam, with the centroiding techniques resulting in a sub-pixel level resolution. The sub-pixel resolution permits utilization of smaller cost-effective focal plane arrays by giving the small focal plane array a resolution associated with much larger focal plane arrays.

7 Claims, 6 Drawing Sheets

METHOD FOR CENTROIDING AND TRACKING A DISTORTED OPTICAL IMAGE

RELATED APPLICATIONS

This application is a divisional of Ser. No. 12/228,511 filed Aug. 11, 2008 which claims rights under 35 USC §119(e) from U.S. Provisional Application Ser. No. 61/010,495 filed Jan. 7, 2008, the contents of which are incorporated herein by reference.

STATEMENT OF GOVERNMENT INTEREST

This invention was made with United States Government support under Contract No. HSSCHQ-04-C-00342 awarded by the Department of Homeland Security. The United States Government has certain rights in this invention.

FIELD OF THE INVENTION

This invention relates to providing countermeasure energy in a very tight pencil beam onto an incoming missile target, and more particularly to a method for precisely pointing the very tight pencil beam onto the target.

BACKGROUND

COUNTERMANPAD Applications abound in which countermeasures are used to deflect or defeat an incoming shoulder-fired missile. In order to divert or defeat the incoming missile, infrared laser radiation is projected towards the target with a so-called jam code which confuses the seeker in the missile and causes the missile to be diverted away from its intended target.

Countermeasuring incoming missiles can be accomplished utilizing flares, and if the incoming missile is a heat-seeking missile, then the heat-seeking missile will follow all the flares as opposed to the original target.

However, if the target is large, meaning it has large bright engines which produce a significant IR signature, then the incoming missile will home in on the rather large thermal signature from the aircraft, such as a 747. If an IR countermeasure laser is used to countermeasure the missile and if its beam is too wide, there will not be enough energy on the missile's seeker and the missile will still home in on the bright engine. Thus, there is a requirement for a pencil thin laser beam to concentrate sufficiently high energy onto the missile's seeker.

If one had an infinitely high-power laser, one could tolerate a wide beam. However, this is not practical and in order to minimize laser power as well as size, it is more appropriate to generate a pencil-thin laser beam which concentrates its energy in a very small but intense spot. The intensity of this laser beam is such that it completely drowns out the thermal signature of a large target.

However, when generating a pencil-thin laser beam, pointing accuracy is of utmost importance. For instance, for such a pencil-thin laser beam there is a requirement that the pointing accuracy be less than a detector's Instantaneous-Field-of-View (IFOV), which at 8 miles is of less than 4 feet.

Ascertaining where the target is to this pointing accuracy is extremely difficult because the IR image of the target is blurred out on the focal plane array normally used and overlaps numbers of pixels. Normally, the resolution is limited to the IFOV of a pixel. For a Focal Plane Array (FPA), the angular error is associated with the size of a pixel, whereas the requirement is on the order of ¼ of a pixel's IFOV.

While auto boresighting techniques are utilized to establish the exact position of the laser beam in space, the center of energy of the blur is difficult to ascertain, especially when utilizing a focal point of array having a resolution limited by the pixel IFOV.

It is therefore important to be able to ascertain laser pointing direction and the IR image center to an accuracy better than that associated with the IFOV of a pixel.

As will be appreciated with a very tight pencil-thin laser beam used for concentrating energy in a very small cross-section, it is exceedingly important to be able to take the blurred out IR missile plume image which can overlap a number of pixels on the focal plane array and determine the exact point at which the laser beam is to be aimed to accuracies greater than the pixel level resolution of the array.

More particularly, detector arrays used in countermeasure systems employ a focal plane array onto which energy is imaged. The resolution of the focal plane array is determined by the size of the array and the pixel size. For very large arrays, such as 1028×1028 arrays, pixel size is very small and resolution is only limited by this small pixel size. In some cases pixel size can be under 10 microns and with improved optics the images can be focused down to such a small spot.

However, these large arrays are costly and exceed weight constraints. More importantly, the read out of so many pixels simultaneously or in rapid succession is difficult and requires a considerable amount of processing. There is therefore a need to provide the same resolution as a large array in a small affordable 128×128 array. To do this one needs sub-pixel resolution.

All things being equal, the size of the pixels determine the effective pixel IFOV and up until the present time, the resolution that determines the location of the target has been limited by the inability of small arrays to resolve focal plane array images below pixel level.

To put it another way, depending on how much jam energy one wants to put on the target, the efficiency of the jamming is related to how large the aircraft is, because the larger the aircraft, the brighter the engine. The brighter the engine, the more energy that must be focused onto the target to sufficiently increase the jam-to-signal ratio or J to S. Depending on the platform one uses, one has to generate a considerable J to S for bright engines.

One can either spread energy out into the environment like a big flashlight beam, but it is very weak compared to the bright engine. Thus, in order to project sufficient energy onto the target, one has to shrink the beam to pencil thinness, thus to concentrate the energy into a small spot. This means that track accuracy is very tight or the spot will miss the target.

SUMMARY OF INVENTION

In order to reduce the tracking error and to overcome the resolution associated with a small focal plane array, the subject invention calculates the center of energy or centroid of the IR image, namely the rocket plume, and utilizes this center-of-energy point as the aiming point for the system.

It has been found with the subject algorithm, that one can locate the center of energy of the target image by interpolation to an accuracy better than 0.25 of a pixel. This means that one can narrow the effective IFOV of a pixel and thus determine target position more accurately; and in fact accurately enough to put the pencil thin laser beam directly on the missile seeker head.

The ability to interpolate to better than a pixel level is dependent upon the signal-to-noise ratio of the system, with the larger the signal-to-noise ratio the better the subject interpolation algorithm works.

In one embodiment, the subject interpolation algorithm is utilized both to ascertain the centroid of the laser beam, which is quite narrow to begin with, and then applies the same algorithm to detect the centroid of the infrared target image.

Using the subject technique, the point at which the laser is aimed in space can be ascertained to accuracies in excess of pixel level accuracy, as can be the center of energy of the infrared target image.

Having successfully ascertained the laser pointing direction utilizing the subject technique, and having then used the subject algorithm to ascertain the center of energy of the infrared target image, one can drive the center of energy of the target image to coincide with the pointing direction of the laser. At this point, the laser beam will be projected onto the target with an error corresponding to a 0.25 pixel effective IFOV.

The algorithm describing the detection of the centroid of the laser beam or IR target image will be described hereinafter.

Essential for the subject algorithm is the overlapping of the image with a number of pixels, and this is normally the case. If the image is too tightly focused it will not overlap adjoining pixels. If such is the case, the system is set up with the focal plane array slightly offset from the focal plane to provide the necessary defocus.

To provide sub-pixel level resolution in a small array, in essence, the subject algorithm considers only a portion of the focal point array, for instance a 3×3 array. The algorithm then obtains the values of the overlapping image along three vertical lines corresponding in position to the center of the respective pixels. Those values are summed and divided by the sum of the values to provide an average value in the X direction. Likewise, in the Y direction, for horizontal rows running through the centers of the three pixels, one can determine by the subject averaging technique, the average position of the image in the Y direction.

This being the case, it is possible to obtain the position of the centroid of the image to an accuracy less than a 0.25 pixel width, thus to give a laser pointing error of less than 0.25 pixel effective IFOV. This permits accurate determination of both the position of the laser beam and the position of the target to such accuracy that a thin laser beam can be projected directly onto the target.

More particularly, the subject algorithm includes the following steps.

1. Seed the algorithm with the brightest pixel in the image;
2. Make sure that the brightest pixel is far away from the edge to perform the centroiding process;
3. Determine the average background around the brightest pixel to be centroided;
4. Limit the area to be centroided;
5. Calculate the target intensity by summing intensities on the centroided area;
6. Remove the background from the target intensity;
7. Calculate the offset for the centroid in the X direction, which is each row's intensities in the centroid is multiplied by a multiplier;
8. Calculate the row coordinate for the centroid by adding the weighted sum to the current row and dividing by the total target intensity;
9. Calculate the offset for the centroid in the Y direction in which each column's intensities in the centroided area is multiplied by a multiplier; and
10. Calculate the column coordinate for the centroid by adding the weighted sum and dividing by the total target intensity.

What is now presented is the centroid equation set that implements the above algorithm:

---

Centroid Equation Set

---

Output Equations are $$\text{row\_centroid} = \text{row\_seed} + \left( \frac{\text{weighted\_sum*row''}}{\text{total\_intensity}} \right)$$

$$\text{col\_centroid} = \text{col\_seed} + \left( \frac{\text{weighted\_sum*col''}}{\text{total\_intensity}} \right)$$

The seed is the pixel having the highest energy. The "weighted sum" terms are generated by the following summations:

$$\text{weighted\_sum} = \sum_{I_{CSR}}^{I_{CER}} \left( \sum_{I_{CSC}}^{I_{CEC}} P(\text{row, col}) \text{ total\_background} \right) - \text{multiplier}$$

Reversing the row and columns summations changes the weighted sum to apply to either row or column.
The multiplier term is computed by an offset against an arbitrary value called "half centroid size"

Given $I_{CER}$ = "Centroid End Row"
Given $I_{CSR}$ = "Centroid Start Row"
Given $I_{CEC}$ = "Centroid End Column"
Given $I_{CSC}$ = "Centroid Start Column"
Given P = Pixel Intensity as function row and column
Then $$\text{Total\_Intensity} = \sum_{I_{CSR}}^{I_{CER}} \sum_{I_{CSC}}^{I_{CEC}} P(\text{row, column})$$

Lastly the "total_Intensity" is itself just a summation about the seed pixel

BRIEF DESCRIPTION OF THE DRAWINGS

These and other features of the subject invention will be better understood in connection with the Detailed Description in conjunction with the Drawings, of which.

DETAILED DESCRIPTION

Figure 1:
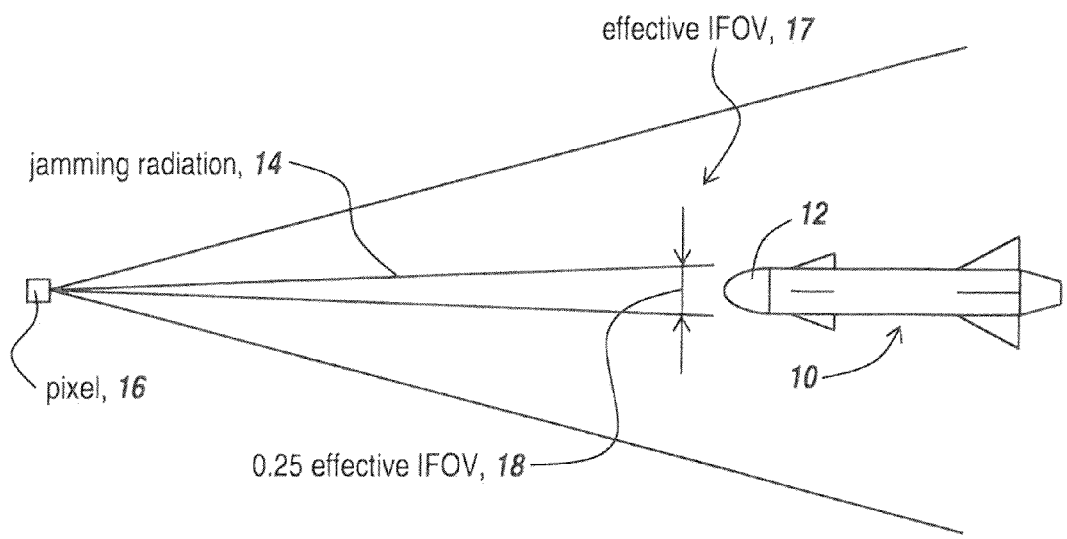
FIG. 1 is a diagrammatic illustration of the use of a pencil thin jamming beam against an incoming threat, indicating that the required aiming accuracy can be achieved by applying the subject technique to bring down the effective instantaneous field of view of a pixel to 0.25 IFOV.

Referring now to FIG. 1, an incoming missile 10 having a seeker head 12 is shown traveling towards its intended target. In order to countermeasure the missile, a pencil thin laser beam 14 is directed towards the missile head. This beam carries a jam code that includes a jamming sequence. The position in space of the pencil thin beam needs to be directly on seeker head 12 to an accuracy of less than a pixel IFOV. Should the angular error exceed more than a pixel IFOV, it is possible that the pencil thin beam may miss its target completely.

More particularly, the effective instantaneous field of view (IFOV) of a singe pixel 16 is shown at 17 and subtends an angle greater than one which would intercept the missile. However, by techniques described herein, despite pixel overlap of the IR target image, the effective resolution of a single pixel can be increased fourfold. This means that the effective IFOV 17 can be cut by ¼ to subtend a 0.25 effective IFOV angle as shown at 18. The result with this accuracy is that a pencil thin laser beam spot will hit jam head 12.

Figure 2:
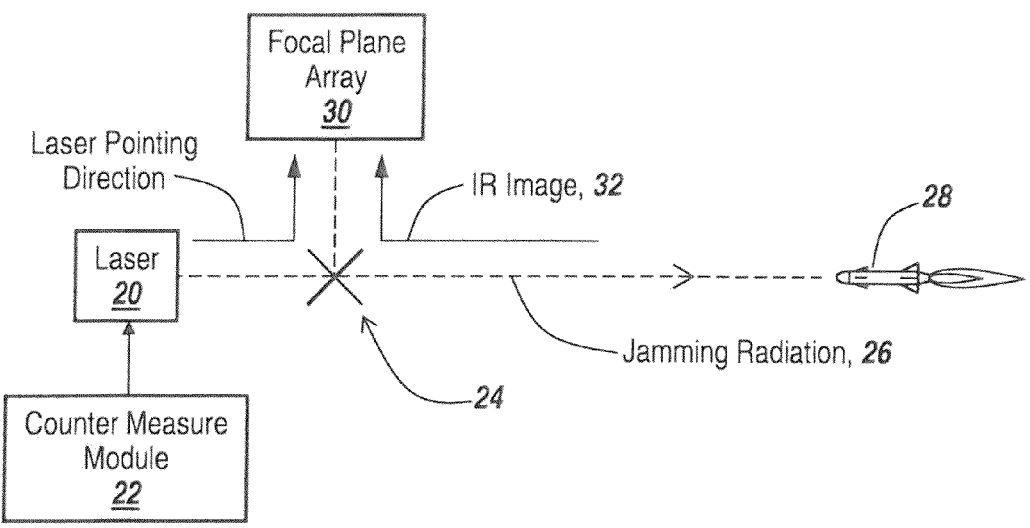
FIG. 2 is a block diagram illustrating the subject countermeasuring system, including a modulated laser, a focal plane array, and an IR target image, along with the utilization of a laser beam combiner.

Referring now to FIG. 2, a typical countermeasure system includes a laser 20 modulated with a jam code 22, projected towards a laser beam combiner 24, which redirects the beam from laser 20 to out along axis 26 towards an incoming missile 28.

The position of optical axis 26, and therefore the direction of the outgoing beam, is determined by directing a portion of the laser output towards a focal plane array 30, from which the position in space of the outgoing beam is ascertained using auto boresighting techniques.

Thereafter, an IR image 32 of the hot rocket exhaust of missile 28 is imaged onto the focal plane array so that the position of the incoming missile may be ascertained.

The laser pointing head is gimballed such that the laser beam from laser 20 is centered on the infrared target image. This is accomplished by imaging the laser beam on the focal plane array and moving the infrared target image detected by the focal plane array to the sensed position of the laser beam.

However, as mentioned above, for small arrays the infrared image of the plume from the target extends over multiple pixels on the focal plane array. Its center of energy, which determines the point in space where the missile is located must be ascertained, typically to a resolution better than the single pixel resolution of the array. In one embodiment, the subject system improves this single pixel resolution fourfold.

Figure 3:
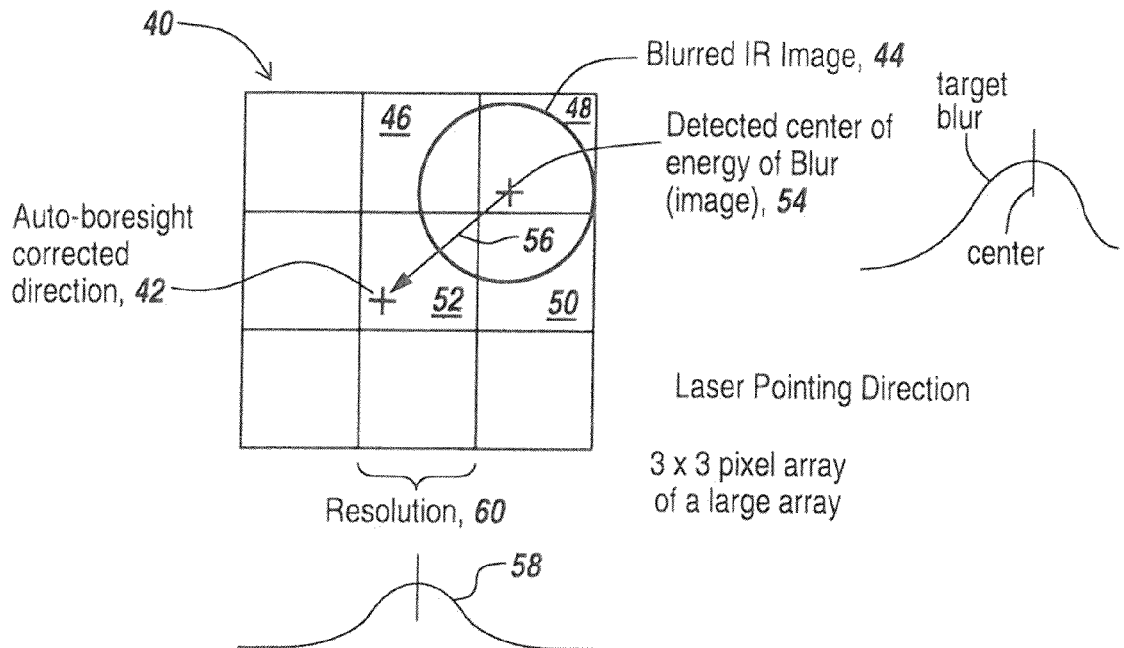
FIG. 3 is a diagrammatic illustration of an auto boresighted laser beam position on a 3×3 focal plane array, also illustrating the detected center of energy of an image blur overlapping multiple pixels, with the center of energy of the blur being moved to correspond to the laser boresight direction, also illustrating the resolution of the focal plane array to be that associated with one pixel.

Referring to FIG. 3, a portion of the focal plane array, here a 3×3 portion, is indicated at 40. Auto boresighting techniques and corrections to be discussed herein provide the precise and corrected position 42 of the laser beam. Also indicated is the detected IR image 44, which as can be seen straddles four pixels, namely pixels 46, 48, 50 and 52 of array 40.

It is the purpose of the interpolation algorithm to find the center of energy of blur 44, here illustrated at 54. As illustrated by arrow 56, this permits moving the detected center of energy to coincide with the auto boresight position. This is done by gimbaling the laser to move the direction of the projected laser beam to end up on the target whose position is ascertained by the detected center of energy of the blur. Put another way, the detected center of energy of the blur is moved to be coincident with the auto boresight corrected position 42.

As can be seen at 58, in one embodiment the target blur is smeared out in a Gaussean fashion, such that it overlaps more than one pixel. The resolution of the array is determined by the pixel size of pixel 60, in one embodiment 30 microns on a side.

It is the purpose of the subject invention to provide aiming accuracy better than a single pixel IFOV, at least for a 128× 128 array having 30 micron pixels.

Figure 4:
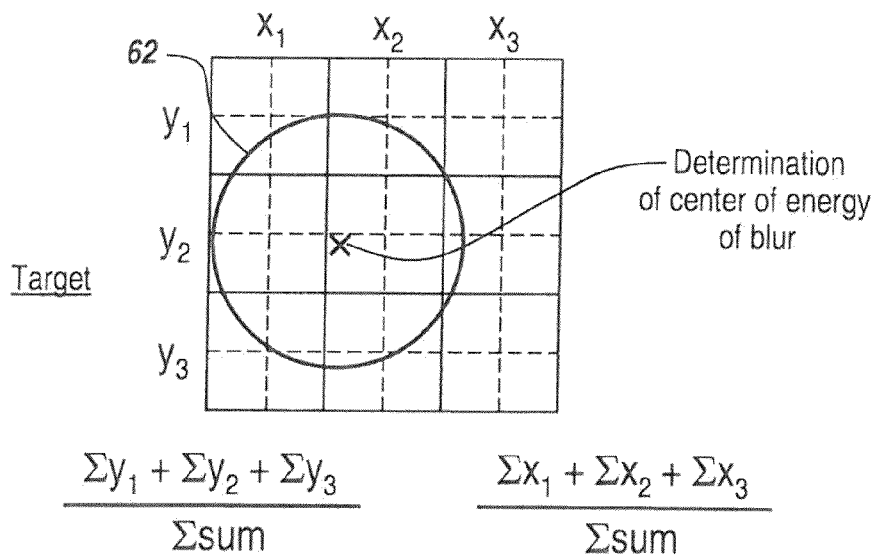
FIG. 4 is a diagrammatic illustration of the subject interpolation algorithm for determining the center of the image blur, indicating summing of energy along vertical columns and horizontal rows which pass through the centers of associated pixels.

Referring now to FIG. 4, how the center of energy of the blur for the target is ascertained as follows:

For the X direction, one measures detected radiation along three columns, $x_1$, $x_2$ $x_3$, which are centered on the respective pixels through which the columns pass.

Likewise, in the Y direction, rows $y_1$, $y_2$, and $y_3$ pass through the centers of the corresponding pixels.

The radiation incident on vertically-spaced pixels along columns $x_1$, $x_2$, and $x_3$ is summed, with the sum of the sums being divided by the sum of all of the detected radiation on the pixels of the array. The same is true for the Y direction.

This scenario has been described by the aforementioned centroiding equations. These equations locate the center of energy of the detected blurred image so that even though the blur overlaps numbers of pixels, its center can be ascertained to less than a pixel width in accuracy.

Figure 5:
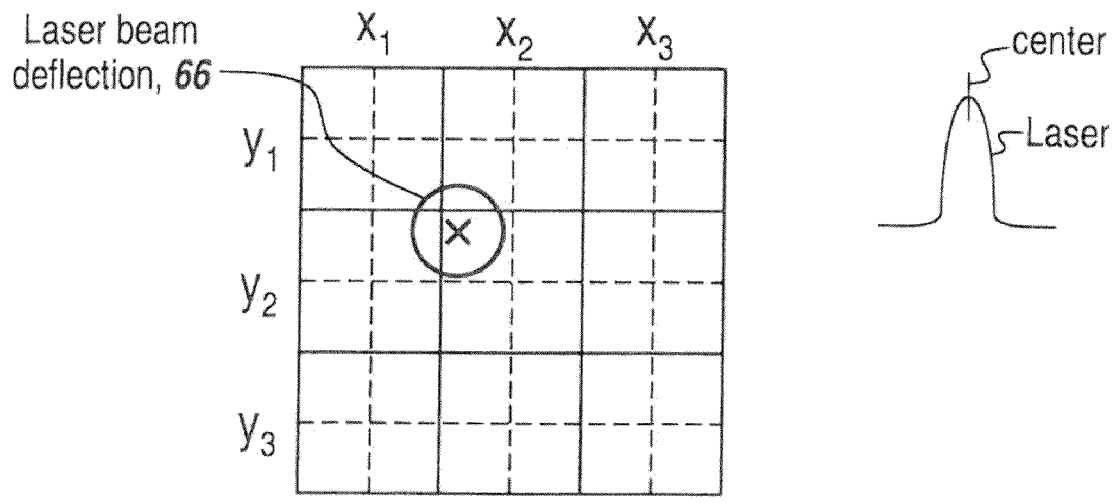
FIG. 5 is a diagrammatic illustration of the determination of the laser beam direction utilizing the subject interpolation algorithm to find the center of energy of a blurred target image.

Referring to FIG. 5, the same technique is utilized to determine the center of energy of the outgoing laser beam, which is shown at 66 to overlap at least three pixels.

While the image of the laser beam on the focal plane array is quite a bit smaller than the blurred image of the target, it is important in the subject invention to be able to ascertain with sub-pixel level accuracy its position.

Thus, when the detected center of energy of the target blur is made coincident with the center of energy of the target laser beam, less than pixel level accuracy is achieved.

Figure 6:
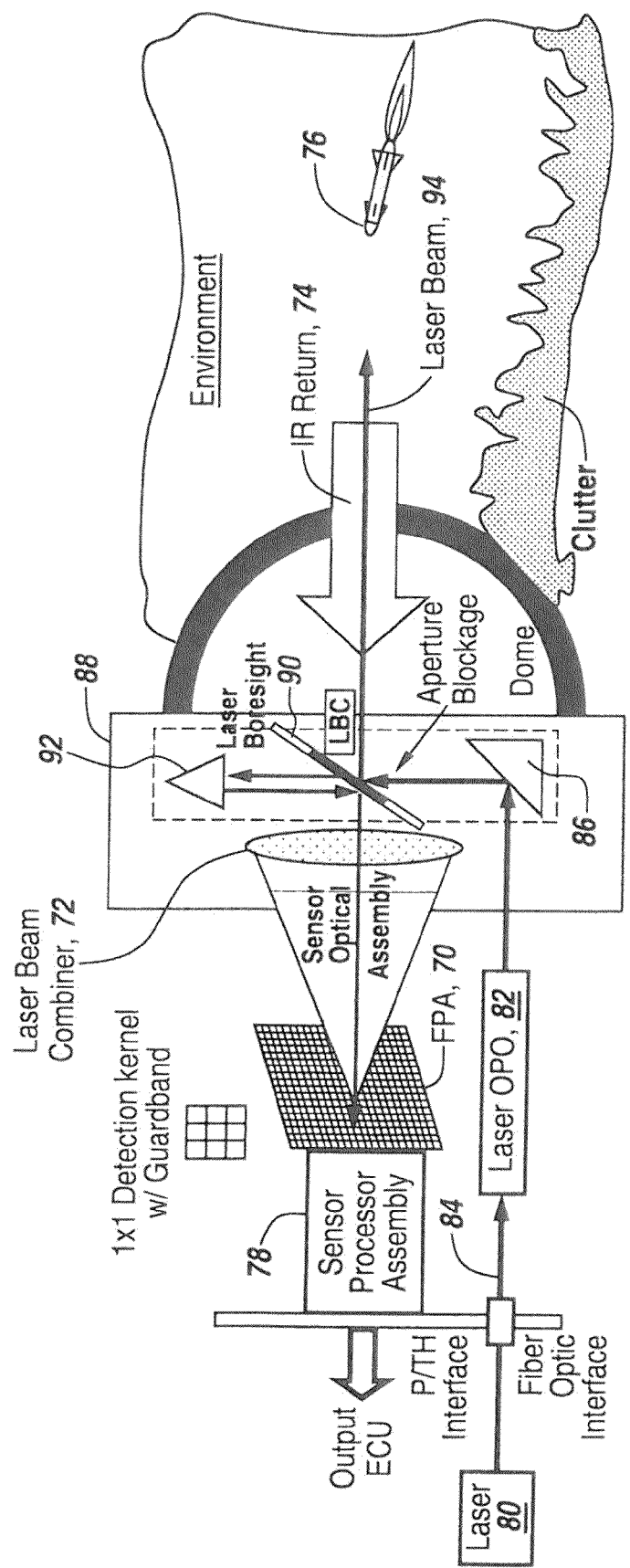
FIG. 6 is a diagrammatic illustration of one embodiment of the subject invention, including a focal plane array, a laser and an optical parametric oscillator in which the output of the optical parametric oscillator is directed to a laser beam combiner both for projection out into the environment of the laser beam and for laser boresighting purposes; and, FIGS. 7A and B are graphs of tracker centroid errors versus signal-to-noise ratio for a blurred IR image and the image of the laser of FIG. 6, also showing three-dimensional image intensity graphs corresponding, respectively, to the blurred infrared image and the laser image on the focal plane array.

Referring now to FIG. 6, in one operative embodiment, a focal plane array 70 with a 1×1 detection kernel with guardband is positioned behind optical assembly 72 which focuses infrared radiation 74 from a missile 76 onto the focal plane array. Here, sensor processor assembly 78 processes the output of the focal plane array.

Laser 80 is coupled to an optical parametric oscillator (OPO) 82 via a fiber optic interface 84, with the output of the OPO being re-directed by a prism 86 in a module 88 through a laser beam combiner 90 and onto a re-directing prism 92, which re-directs the laser beam back to the laser beam combiner and then to the focal plane array. The position of the laser beam image on the focal plane array specifies the aiming direction of the laser, and this position is refined by the subject interpolation algorithm.

The position of laser beam 94 in space is thus first determined by picking off a portion of the laser beam from the optical parametric oscillator and determining its position, again through the utilization of the subject interpolation algorithm.

Likewise, the infrared return from missile 76 passes through the laser beam combiner 90 and onto the focal plane array as the aforementioned blur.

As will be discussed hereinafter, the utilization of the laser beam combiner degrades the signal-to-noise ratio of the system due to aperture blockage. To the extent that this blockage is minimized the signal-to-noise ratio is increased. The above reduction of the effective single pixel IFOV in one embodiment requires a signal-to-noise ratio greater than 20.

Figure 7A:
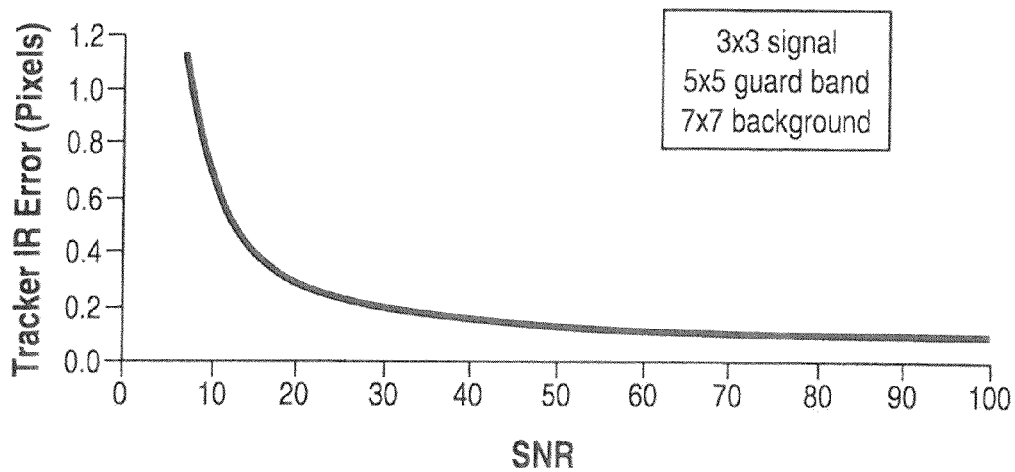
Figure 7A:
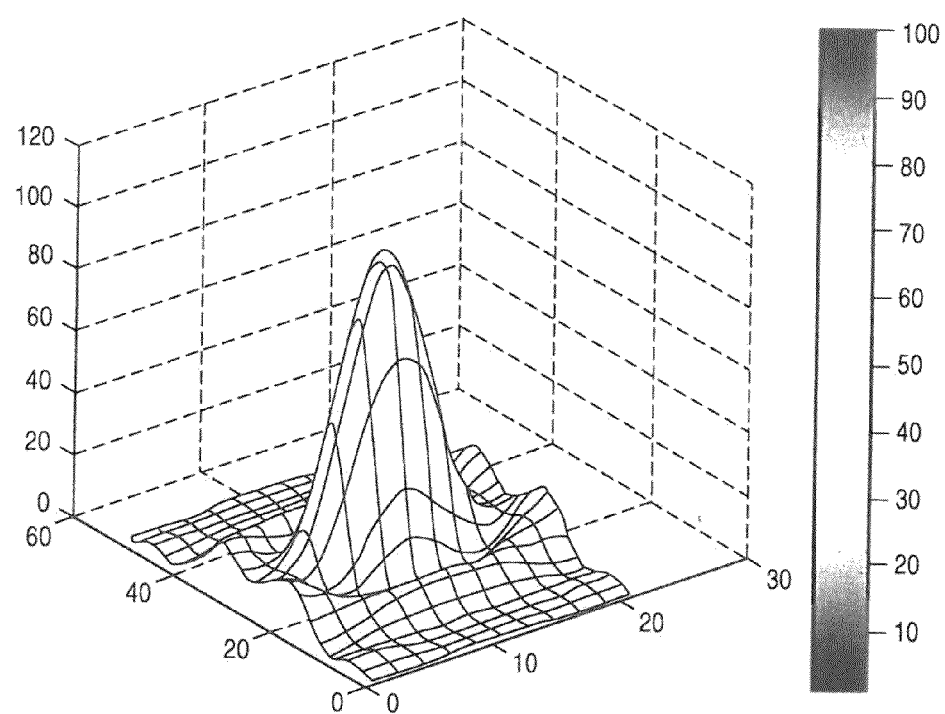
Figure 7B:
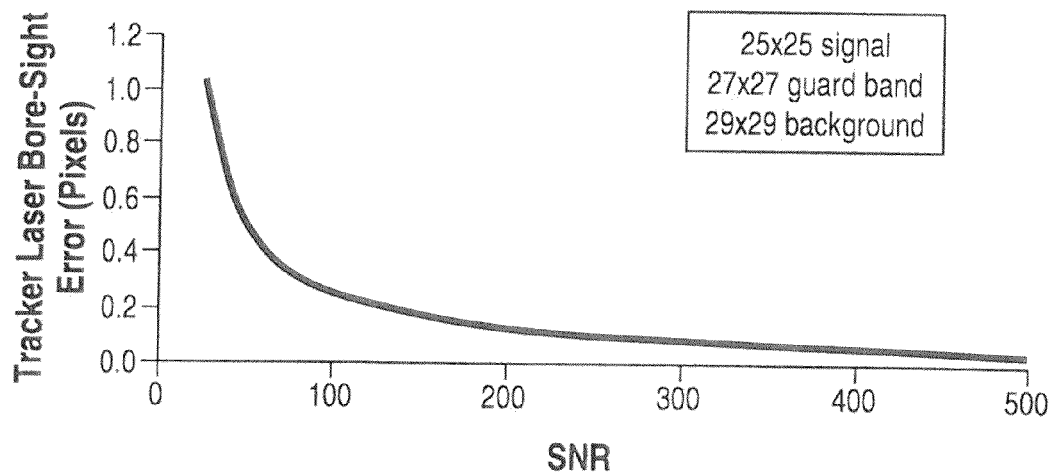
Figure 7B:
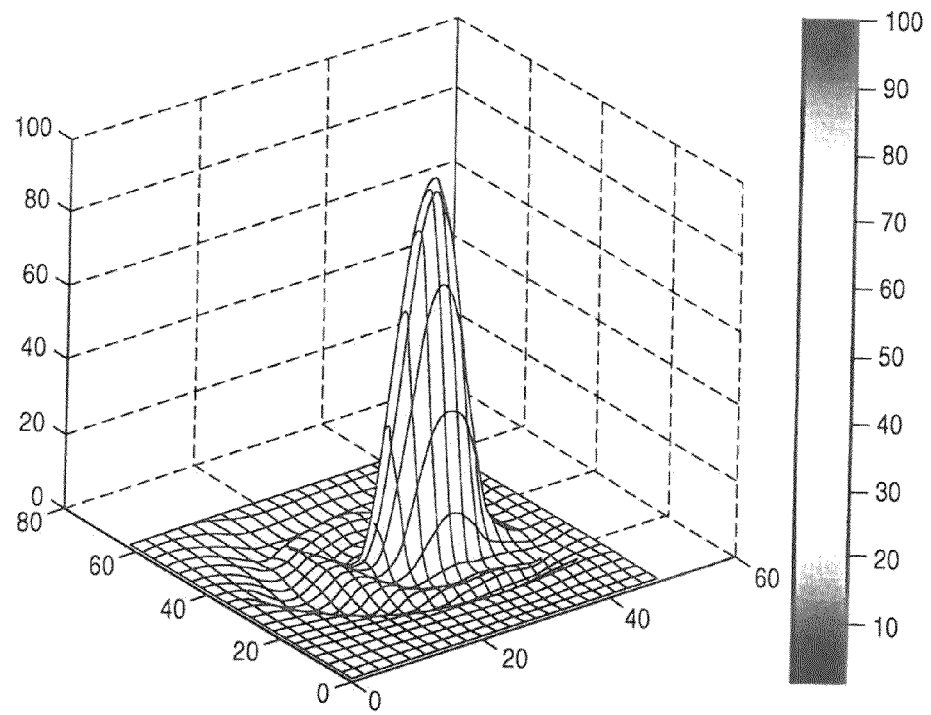

Referring now to FIGS. 7A and 7B, what is seen are graphs of the IR tracking error and laser boresight error graphed against signal-to-noise ratio.

To the right of FIG. 7A is a three-dimensional representation of the target blur intensity indicating a fairly pronounced center region and side lobes.

It can be seen from the graph of FIG. 7A that a signal-to-noise ratio of 20 provides a tracker error of less than one pixel width, and in this case 0.25 of the pixel, leading to an effective 0.25 IFOV for the pixel.

Note that if the signal-to-noise ratio less than about 8, there is no advantage with the subject interpolating algorithm.

Likewise, referring to FIG. 7B, although the laser beam has a considerably better defined cross-section and shape, with a signal-to-noise ratio of about 100, the tracker/laser boresight error is again less than one pixel width, and in this case is also 0.25 of the pixel.

The algorithm for interpolation is provided below.

```
function [row_centroid,col_centroid] =
determine_target_centroid(data,row_seed,col_seed)
% Target Centroid calculation;
% initial values for track error
%   background_width = 7;
%   half_centroid_size = 2;
%   centroid_width =3;
% initial values for laser (boresight error)
background_width = 29;
half_centroid_size = 2;
centroid_width =25;
% maxval = max(max(data));
% maxval = max(max(data(29:35,29:35)));
% given the seed which is the brightest pixel in the
image.We will use that one for the
% centroid
brightest_pixel_row = round(row_seed);
brightest_pixel_col = round(col_seed);
brightest_pixel_intensity =
data(brightest_pixel_row,brightest_pixel_col);
% Make sure the brightest pixel is far away from the edge
to perform the
% centroid. This is the function of the size of the
centroid
[obstructed_edge,row,col] =
Check_detection_edges(brightest_pixel_row,...
brightest_pixel_col,background_width,half_centroid_size,data);
% Now determine the average background around the hit to be
centroided
[average_background] =
determine_target_background(brightest_pixel_row,...
brightest_pixel_col,obstructed_edge,half_centroid_size,data,
centroid_width);
total_background = average_background * centroid_width;
% limits of the area to centroid
centroid_start_row = brightest_pixel_row -
half_centroid_size;
centroid_end_row = brightest_pixel_row +
half_centroid_size;
centroid_start_col = brightest_pixel_col -
half_centroid_size;
centroid_end_col = brightest_pixel_col +
half_centroid_size;
% Total target intensity is calculated by summimg the
intensities on the
% centroid area
total_intensity =0;
for i = centroid_start_row : centroid_end_row
    for j = centroid_start_col : centroid_end_col
        pixel_intensity = data(i,j);
        total_intensity = total_intensity +
pixel_intensity;
        pixel_array(i,j) = pixel_intensity;
    end
end
% Removing the background from the target intensity
total_intensity = total_intensity - average_background;
if total_intensity > 0
    weighted_sum = 0;
    multiplier = - half_centroid_size;
    % calculation of the offset for the centroid
    % each rows intensities in centroid area are multiplied
by a multiplier
    for i = centroid_start_row : centroid_end_row
        weighted_row =0;
        for j=centroid_start_col : centroid_end_col
            weighted_row = weighted_row + pixel_array(i,j);
        end
        weighted_sum = weighted_sum + (weighted_row-
total_background)*multiplier;
        multiplier = multiplier +1;
    end
    % the row coordinate for centroid is calculated by
adding weighted sum
    % to current row and dividing up by the total target
intensity
    row_centroid = row_seed +
(weighted_sum/total_intensity);
    weighted_sum = 0;
    multiplier = - half_centroid_size;
    % each columns intensities in centroid area are
multiplied by a multiplier
    for i = centroid_start_col : centroid_end_col
        weighted_col =0;
        for j=centroid_start_row : centroid_end_row
            weighted_col = weighted_col + pixel_array(j,i);
        end
        weighted_sum = weighted_sum + (weighted_col-
total_background)*multiplier;
        multiplier = multiplier +1;
    end
    % the column coordinate for centroid is calculated by
adding weighted sum
    % to current column and dividing up by the total target
intensity
    col_centroid = col_seed +
(weighted_sum/total_intensity);
else
    row_centroid = brightest_pixel_row;
    col_centroid = brightest_pixel_col;
end
```

It can therefore be seen that the laser aiming accuracy is critically dependent upon reducing the effective pixel IFOV which improves the resolution of the focal plane array, thus to more accurately direct the pencil-thin laser beam onto the target.

What is claimed is:

1. A method for improving the resolution of a focal plane array used in an optical tracking system to sub-pixel resolution, comprising the steps of:
    processing the output of the focal plane array using centroiding to ascertain the center of images on the focal plane array that overlap multiple pixels for establishing the center of energy of the image on the focal plane array to sub-pixel level resolution; and,
    utilizing the centroided image information to establish the position of an infrared image on the focal plane array, wherein the infrared image includes a target image and wherein the optical tracking system includes a laser modulated with a jam code for countermeasuring the target.

2. The method of claim 1, wherein the optical tracking system includes using centroiding to detect by a portion of the image of the laser beam on the focal plane array the pointing direction of the laser beam.

3. The method of claim 2, and further including the step of determining to a sub-pixel level the position of the infrared target image and to a sub-pixel level the position of the portion of a laser beam, and, changing the position of the laser beam so as to effectuate coincidence between the centroided position of the target image and the centroided position of the laser beam, whereby sub-pixel resolution is afforded to the optical tracking system.

4. The method of claim 3, wherein the sub-pixel level resolution results in a pointing accuracy of less than the number of microradians associated with sub-pixel level accuracy.

5. The method of claim 4, wherein the sub-pixel level resolution is less than a 0.25 IFOV.

6. The method of claim 1, wherein the focal plane array is a 128×128 array or a 256×256 array.

7. The method of claim 6, wherein the 128×128 or 256×256 array includes 30 micron pixels.

* * * * *